United States Patent [19]

Wideman et al.

[11] Patent Number: 5,792,800
[45] Date of Patent: Aug. 11, 1998

[54] WIRE COAT COMPOUND CONTAINING ESTERS OF AMINOBENZOIC ACID

[75] Inventors: Lawson Gibson Wideman, Tallmadge; William Paul Francik; Adel Farhan Halasa, both of Bath, all of Ohio

[73] Assignee: The Goodyear Tire & Rubber Company, Akron, Ohio

[21] Appl. No.: 778,436

[22] Filed: Jan. 2, 1997

[51] Int. Cl.⁶ .................................................. C08J 5/17
[52] U.S. Cl. ........................ 524/240; 524/398; 156/910
[58] Field of Search ........................... 524/240, 398; 156/910

[56] References Cited

U.S. PATENT DOCUMENTS

| | | | |
|---|---|---|---|
| 4,203,874 | 5/1980 | Halasa et al. | 524/240 |
| 4,239,663 | 12/1980 | Ravagnani et al. | 524/240 |
| 4,306,930 | 12/1981 | Cowell et al. | 524/240 |

*Primary Examiner*—Peter D. Mulcahy
*Attorney, Agent, or Firm*—Bruce J. Hendricks

[57] ABSTRACT

This invention relates to the discovery that esters of aminobenzoic acid, when used as a replacement in whole or in part of conventional cobalt materials, maintains the rubber-to-wire adhesion properties.

15 Claims, No Drawings

WIRE COAT COMPOUND CONTAINING ESTERS OF AMINOBENZOIC ACID

BACKGROUND OF THE INVENTION

U.S. Pat. No. 4,513,121 discloses rubber skim stock containing organo-cobalt compounds as adhesion promoters. Representative examples of such organo-cobalt compounds include cobalt salts of fatty acids, cobalt salts of aliphatic or alicyclic carboxylic acids having from 6 to 30 carbon atoms, cobalt chloride, cobalt naphthenate, cobalt carboxylate and organo-cobalt-boron complexes. Problems associated with such organo-cobalt compounds include its availability and strong pro-oxidant properties which can adversely affect rubber by accelerating oxidation.

SUMMARY OF THE INVENTION

The present invention relates to a rubber composition particularly suited as a wire coat stock containing esters of aminobenzoic acid.

DETAILED DESCRIPTION OF THE INVENTION

There is disclosed a wire coat compound comprising:

(a) a rubber selected from the group consisting of natural rubber and a blend of natural rubber and a synthetic rubber derived from a diene monomer; and (b) from about 0.1 to about 10 phr of an ester of aminobenzoic acid of the formula:

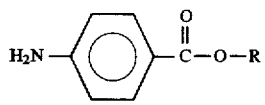

wherein R is an alkyl radical having from 8 to 24 carbon atoms;

(c) from 0.1 to 10 phr of a methylene acceptor; and
(d) from 0.1 to 10 phr of a methylene donor.

The esters of aminobenzoic acid for use in the present invention are of the above formula I. Preferably, R is an alkyl radical having from 8 to 24 carbon atoms. Representative examples of such esters include octyl aminobenzoate, nonyl aminobenzoate, decyl aminobenzoate, undecyl aminobenzoate, dodecyl aminobenzoate, tridecyl aminobenzoate, tetradecyl aminobenzoate, pentadecyl aminobenzoate, hexadecyl aminobenzoate, heptadecyl aminobenzoate, octadecyl aminobenzoate, nonadecyl aminobenzoate and eicosyl aminobenzoate.

Whereas the most common isomeric form of the above esters is, for example, octadecyl-4-aminobenzoate, it is contemplated herein that the 3-and even the 2- forms may be used. For ease of preparation and cost, the 4-isomeric form is preferred.

The above ester is present in the wire coat compound in a range of from about 0.1 to 10 phr. Preferably, the ester is present in an amount ranging from about 0.5 to 2 phr.

The wire coat compound contains natural rubber. The natural rubber includes its various forms, e.g., pale crepe and smoked sheet, and balata and gutta percha. The rubber may be solely natural rubber or a blend of natural rubber and synthetic rubber. The synthetic polymers are derived from a diene monomer and include those prepared from a single monomer (homopolymer) or a mixture of two or more copolymerizable monomers (copolymer) when the monomers are combined in the random distribution or block form. The monomers may be substituted or unsubstituted and may possess one or more double bonds, conjugated and nonconjugated dienes and monoolefins, including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene, 1,5-hexadiene, dicyclopentadiene, 1,5-cyclooctadiene, and ethyldiene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methylcyclooctene. Examples of vinyl monomers are styrene, acrylonitrile, acrylic acid, ethylacrylate, vinyl chloride, butylacrylate, methyl vinyl ether, vinyl acetate and vinyl pyridine. Examples of vinylidene monomers are alpha-methylstyrene, methacrylic acid, methyl methacrylate, itaconic acid, ethyl methacrylate, glycidyl methacrylate and vinylidene chloride. Representative examples of the synthetic polymers used in the practice of this invention are polychloroprene homopolymers of a conjugated 1,3-diene such as isoprene and butadiene, and in particular, polyisoprenes and polybutadienes having essentially all of their repeat units combined in a cis-1,4-structure; and copolymers of a conjugated 1,3-diene such as isoprene and butadiene with up to 50 percent by weight of at least one copolymerizable monomer, including ethylenically unsaturated monomers such as styrene or acrylonitrile; and butyl rubber, which is a polymerization product of a major proportion of a monoolefin and a minor proportion of a diolefin such as butadiene or isoprene. The rubber may be emulsion polymerized or solution polymerized.

The preferred synthetic rubbers which may be used with the present invention are cis-1,4-polyisoprene, polybutadiene, polychloroprene and the copolymers of isoprene and butadiene, copolymers of acrylonitrile and butadiene, copolymers of acrylonitrile and isoprene, copolymers of styrene, butadiene and isoprene, copolymers of styrene and butadiene and blends thereof. Since the compounds of the present invention are used as a wire coat composition, natural rubber is preferably present and may even be partially replaced with some synthetic rubber. When used as a blend, the natural rubber is preferably present in an amount ranging from 5 to 95 weight percent of the total rubber present in the wire coat compound.

In-situ resins are formed in the wire coat stock and involve the reaction of a methylene acceptor and a methylene donor. The term "methylene donor" is intended to mean a compound capable of reacting with a methylene acceptor and generate the resin in-situ. Examples of methylene donors which are suitable for use in the present invention include hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

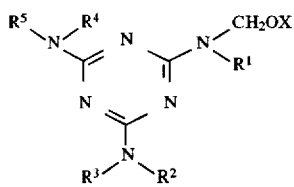

wherein X is an alkyl having from 1 to 8 carbon atoms, $R^1$ $R^2$, $R^3$, $R^4$ and $R^5$ are individually selected from the group consisting of hydrogen, an alkyl having from 1 to 8 carbon atoms, the group —$CH_2OX$ or their condensation products. Specific methylene donors include hexakis-(methoxymethyl)melamine, N,N',N"-trimethyl/N,N', N"-trimethylolmelamine, hexamethylolmelamine, N-methylolmelamine, N,N'-dimethylolmelamine, N,N',N"-tris(methoxymethyl)melamine and N,N'N"-tributyl-N,N', N"-trimethylol-melamine. The N-methylol derivatives of melamine are prepared by known methods.

The amount of methylene donor that is present in the rubber stock may vary. Typically, the amount of methylene donor that is present will range from about 0.1 phr to 10.0 phr. Preferably, the amount of methylene donor ranges from about 2.0 phr to 5.0 phr.

Examples of methylene acceptors include activated phenols by ring substitution and a cashew nut oil modified novalak-type phenolic resin. Representative examples of activated phenols by ring substitution include resorcinol, cresols, t-butyl phenols, isopropyl phenols, ethyl phenols and mixtures thereof. Cashew nut oil modified novolak-type phenolic resins are commercially available from Schenectady Chemicals Inc under the designation SP6700. The modification rate of oil based on total novolak-type phenolic resin may range from 10 to 50 percent. For production of the novolak-type phenolic resin modified with cashew nut oil, various processes may be used. For example, phenols such as phenol, cresol and resorcinol may be reacted with aldehydes such as formaldehyde, paraformaldehyde and benzaldehyde using acid catalysts. Examples of acid catalysts include oxalic acid, hydrochloric acid, sulfuric acid and p-toluenesulfonic acid. After the catalytic reaction, the resin is modified with the oil.

The amount of methylene acceptor that is present in the rubber stock may vary. Typically, the amount of methylene acceptor that is present will range from about 0.1 phr to 10 phr. Preferably, the amount of methylene acceptor ranges from about 2.0 phr to 5.0 phr.

As known to one skilled in the art, in order to cure a rubber stock, one needs to have a sulfur vulcanizing agent. Examples of suitable sulfur vulcanizing agents include elemental sulfur (free sulfur) or a sulfur donating vulcanizing agent, for example, an amine disulfide, polymeric polysulfide or sulfur olefin adducts. Preferably, the sulfur vulcanizing agent is elemental sulfur in the insoluble form. The amount of sulfur vulcanizing agent will vary depending on the components of the rubber stock and the particular type of sulfur vulcanizing agent that is used. The sulfur vulcanizing agent is generally present in an amount ranging from about 0.5 to about 8 phr. Preferably, the sulfur vulcanizing agent is present in an amount ranging from about 0.75 phr to about 4.0 phr.

Conventional rubber additives may be incorporated in the rubber stock of the present invention. The additives commonly used in rubber stocks include fillers, plasticizers, waxes, processing oils, retarders, antiozonants, antioxidants and the like. The total amount of filler that may be used may range from about 30 to about 150 phr, with a range of from about 45 to about 100 phr being preferred. Fillers include clays, calcium carbonate, calcium silicate, titanium dioxide and carbon black. Representatives carbon blacks that are commonly used in rubber stocks include N326, N330, N472, N630, N642, N660, N754, N762, N765 and N990. Plasticizers are conventionally used in amounts ranging from about 2 to about 50 phr with a range of about 5 to about 30 phr being preferred. The amount of plasticizer used will depend upon the softening effect desired. Examples of suitable plasticizers include aromatic extract oils, petroleum softeners including asphaltenes, pentachlorophenol, saturated and unsaturated hydrocarbons and nitrogen bases, coal tar products, cumarone-indene resins and esters such as dibutylphthalate and tricresol phosphate. Common waxes which may be used include paraffinic waxes and microcrystalline blends. Such waxes are used in amounts ranging from about 0.5 to 3 phr. Materials used in compounding which function as an accelerator-activator includes metal oxides such as zinc oxide and magnesium oxide which are used in conjunction with acidic materials such as fatty acid, for example, stearic acid, oleic acid and the like. The amount of the metal oxide may range from about 1 to about 14 phr with a range of from about 2 to about 8 phr being preferred. The amount of fatty acid which may be used may range from about 0 phr to about 5.0 phr with a range of from about 0 phr to about 2 phr being preferred.

Accelerators are used to control the time and/or temperature required for vulcanization and to improve the properties of the vulcanizate. In one embodiment, a single accelerator system may be used; i.e., primary accelerator. The primary accelerator(s) may be used in total amounts ranging from about 0.5 to about 4, preferably about 0.8 to about 2.0, phr. In another embodiment, combinations of a primary and a secondary accelerator might be used with the secondary accelerator being used in a smaller, equal or greater amount to the primary accelerator. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The rubber compounds of the present invention may also contain a cure activator. A representative cure activator is methyl trialkyl ($C_8$–$C_{10}$) ammonium chloride commercially available under the trademark Adogen® 464 from Sherex Chemical Company of Dublin, Ohio. The amount of activator may be used in a range of from 0.05 to 5 phr.

Siliceous pigments may be used in the rubber compound applications of the present invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate. Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the*

*American Chemical Society*, Volume 60, page 304 (1930). The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size. Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc. Generally speaking, the amount of silica may range from 5 to 120 phr. Since the intended use of the present invention is as a wire coat compound, the silica will generally range from about 10 to 30 phr.

A class of compounding materials known as scorch retarders are commonly used. Phthalic anhydride, salicylic acid, sodium acetate and N-cyclohexyl thiophthalimide are known retarders. Retarders are generally used in an amount ranging from about 0.1 to 0.5 phr.

Conventionally, antioxidants and sometimes antiozonants, hereinafter referred to as antidegradants, are added to rubber stocks. Representative antidegradants include monophenols, bisphenols, thiobisphenols, polyphenols, hydroquinone derivatives, phosphites, thioesters, naphthyl amines, diphenyl-p-phenylenediamines, diphenylamines and other diaryl amine derivatives, para-phenylenediamines, quinolines and mixtures thereof. Specific examples of such antidegradants are disclosed in The Vanderbilt Rubber Handbook (1990), pages 282–286. Antidegradants are generally used in amounts from about 0.25 to about 5.0 phr with a range of from about 1.0 to about 3.0 phr being preferred.

The rubber compound of the present invention is used as a wire coat or bead coat for use in a tire. In such instances, the ester of aminobenzoic acid may be used as a replacement in whole or in part for cobalt materials. When it is desired to use the ester of aminobenzoic acid as a partial replacement, any of the cobalt materials known in the art to promote the adhesion of rubber to metal may be used. Thus, suitable cobalt materials which may be employed include cobalt salts of fatty acids such as stearic, palmitic, oleic, linoleic and the like; cobalt salts of aliphatic or alicyclic carboxylic acids having from 6 to 30 carbon atoms, such as cobalt neodecanoate; cobalt chloride, cobalt naphthenate; cobalt carboxylate and an organo-cobalt-boron complex commercially available under the designation Manobond C from Wyrough and Loser, Inc, Trenton, N. J. Manobond C is believed to have the structure:

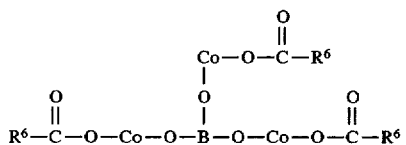

in which $R^6$ is an alkyl group having from 9 to 12 carbon atoms.

Amounts of organo-cobalt compound which may be employed depend upon the specific nature of the cobalt material selected, particularly the amount of cobalt metal present in the compound.

The amount of the cobalt material may range from about 0.2 to 5 phr. Preferably, the amount of cobalt compound may range from about 0.5 to 2 phr. When used, the amount of cobalt material present in the stock composition should be sufficient to provide from about 0.01 percent to about 0.50 percent by weight of cobalt metal based upon total weight of the rubber stock composition with the preferred amounts being from about 0.03 percent to about 0.2 percent by weight of cobalt metal based on total weight of skim stock composition.

The sulfur vulcanizable rubber compound is cured at a temperature ranging from about 125° C. to 180° C. Preferably, the temperature ranges from about 135° C. to 1600° C.

The mixing of the rubber compound can be accomplished by methods known to those having skill in the rubber mixing art. For example, the ingredients are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The ester of aminobenzoic acid and cobalt compound, if used, is mixed in one or more non-productive mix stages. The sulfur and accelerator(s) are generally mixed in the productive mix stage. The terms "non-productive" and "productive" mix stages are well known to those having skill in the rubber mixing art.

The rubber composition of this invention is directed to wire coat or bead coat compounds. For example, it can be used for wire coat in hose, belts and, in particular, tires. Such pneumatic tires can be built, shaped, molded and cured by various methods which are known and will be readily apparent to those having skill in such art. As can be appreciated, the tire may be a passenger tire, aircraft tire, truck tire and the like.

The present invention may be better understood by reference to the following examples in which the parts or percentages are by weight unless otherwise indicated.

EXAMPLE 1

Preparation of Octadecyl-4-Aminobenzoate

A 1-liter round bottom flask was fitted with a reflux condenser, Dean Stark trap and heating mantle and charged with 54 g (0.20 mole) of 1-octadecanol, 33 g (0.20 mole) ethyl 4-aminobenzoate, 8 g of p-toluenesulfonic acid and 500 ml of mixed xylenes. The flask was flushed with nitrogen and sealed under a nitrogen balloon. The reaction system was heated to reflux with a pot temperature of about 140° C. and allowed to reflux for about ½ hour before a 25 ml-aliquot of xylenes-ethanol mixture was removed through the Dean-Stark trap. Every 5–10 minutes, another 25 ml aliquot of the xylenes-ethanol mixture was removed until a total of 400 ml had been withdrawn from the reaction mixture and the pot attained a temperature of 150° C. Remaining volatiles were removed under 29 inches of Hg vacuum at 70° C. in a vacuum oven to give 95 g of an off-white waxy material melting at 60°–70° C., with an infrared spectrum showing the amino-aromatic ester with a long-chain aliphatic tail.

EXAMPLE 2

Each rubber stock was prepared in a two non-productive, one productive Banbury mix procedure. Other than the ingredients listed in Table I, the nonproductive stages for both samples contained synthetic polyisoprene, natural rubber, resorcinol, cobalt compound (if used), octadecyl-4-aminobenzoate (if used) and conventional amounts of processing oil, stearic acid, zinc oxide, carbon black, antidegradants and silica. The hexamethoxymelamine along with convention amounts of accelerators, antidegradant, zinc oxide and sulfur were added during the productive stage. Table I below shows the levels of rubber, cobalt compound, resorcinol, hexamethoxymelamine and octadecyl-4-aminobenzoate which was used. All parts and percentages are by weight unless otherwise noted.

TABLE I

| Sample | Control 1 | Control 2 | 3 | 4 | 5 | 6 |
|---|---|---|---|---|---|---|
| Synthetic Polyisoprene[1] | 25 | 25 | 25 | 25 | 25 | 25 |
| Natural Rubber | 75 | 75 | 75 | 75 | 75 | 75 |
| Cobalt Naphthenate | 1.0 | 0.50 | .50 | 0.5 | 0 | 0 |
| Octadecyl-4-Aminobenzoate | 0 | 0 | .50 | 1.0 | .50 | 1.0 |
| Resorcinol | 4 | 4 | 4 | 4 | 4 | 4 |
| Hexamethoxymelamine | 3 | 3 | 3 | 3 | 3 | 3 |

[1]Solution polymerized polyisoprene commercially available from The Goodyear Tire & Rubber Company under the trademark description Natsyn® 2200.

Cure properties were determined using a Monsanto oscillating disc rheometer which was operated at a temperature of 150° C. and 100 cycles per minute. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following Table II reports cure properties that were determined from cure curves that were obtained for the rubber stocks that were prepared. These properties include a torque minimum (Min. Torque), a torque maximum (Max. Torque), minutes to 25 percent of the torque increase (t25) and minutes to 90 percent of the torque increase (t90).

Strebler adhesion testing was done to determine the interfacial adhesion between the rubber formulations that were prepared. The interfacial adhesion was determined by pulling one compound from another at a right angle to the untorn test specimen with the two right ends being pulled apart at a 1800° angle to each other using an Instron machine. The area of contact was determined from placement of a Mylar® sheet between the compounds during cure. A window in the Mylar® allowed the materials to come into contact with each other during testing.

Standard wire adhesion tests (SWAT) were conducted by embedding a single brass-plated cord in the respective rubber compositions. The rubber articles were then cured at 150° C. for 28 minutes. The steel cord in these rubber compositions were then subjected to a pull-out test, according to ASTM Standard D2229-73. The results of these pull-out tests (SWAT) are given below and identified as Original in Table II and expressed in Newtons. Adhesion tests were also conducted on the rubber articles after curing and then subjecting the cured samples to (1) 5 days in water at 90° C., (2) 10 days in water at 90° C. and (3) 10 days at 90° relative humidity at 75° C.

TABLE II

| Sample | Control 1 | Control 2 | 3 | 4 | 5 | 6 |
|---|---|---|---|---|---|---|
| Cobalt Naphthenate (phr) | 1.0 | 0.5 | .50 | .5 | 0 | 0 |
| Ester of Example 1 | 0 | 0 | .50 | 1.0 | .50 | 1.0 |
| Rheometer Cure at 150° C. | | | | | | |
| Min Torque | 7.1 | 7.8 | 8.0 | 8.2 | .7.8 | 7.8 |
| Max Torque | 61.7 | 58.9 | 62.1 | 61.4 | 63.2 | 61.9 |
| T25 (min) | 6.3 | 6.3 | 6.0 | 5.9 | 5.9 | 5.9 |
| T90 (min) | 16.7 | 17.3 | 16.6 | 16.4 | 16.2 | 16.3 |
| Cured Properties | | | | | | |
| 300% Modulus (MPa) | 13.9 | 12.8 | 13.9 | 13.5 | 14.1 | 13.5 |
| Tensile @ Break (MPa) | 18.4 | 18.9 | 18.8 | 18.8 | 18.7 | 18.0 |
| Elongation @ Break (%) | 430 | 460 | 430 | 450 | 422 | 440 |
| Rebound @ RT | 40.8 | 41.7 | 42.3 | 42.1 | 42.1 | 42 |
| Rebound @ 100° C. | 56.2 | 56.6 | 57.6 | 57.7 | 57.3 | 57.5 |
| Hardness @ RT | 80.8 | 77.8 | 80.6 | 79.0 | 80 | 78.1 |
| Hardness @ 100° C. | 76 | 73.8 | 76.3 | 75.5 | 75.8 | 74.4 |
| Strebler Adhesion @ 95° C. to Self | 44 | 77 | 42 | 47 | 46 | 43 |
| Monsanto Fatigue to Failure (cycles) | 500 | 652 | 604 | 703 | 545 | 500 |
| SWAT (Newtons) | | | | | | |
| Original | 615 | 621 | 652 | 622 | 652 | 625 |
| Aged (75° C. 10 days in 90° RH) | 720 | 700 | 730 | 711 | 740 | 730 |
| Aged (90° C. 5 days in water) | 652 | 600 | 650 | 600 | 636 | 630 |
| Aged (90° C. 10 days in water) | 420 | 431 | 430 | 431 | 451 | 416 |

Table II shows that the total or partial replacement of cobalt with the long-chain ester of 4-aminobenzoic acid maintains the state of cure of the rubber, the stress-strain properties, rebound and hardness and Strebler adhesion of the rubber to itself at 1.0 phr cobalt. The fatigue-to-failure cycles is also maintained or exceeded with cobalt replacement.

The original and aged SWAT adhesion of the wire coat compounds containing a partial or total replacement of cobalt material with the long chain ester of 4-aminobenzoic acid was most importantly maintained to the controls, after aging.

What is claimed is:

1. A wire coat compound comprising:
   (a) a rubber selected from the group consisting of natural rubber and blends of natural rubber and a synthetic rubber derived from a diene monomer;
   (b) from about 0.1 to about 10 phr of an ester of aminobenzoic acid of the formula:

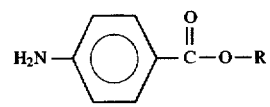

wherein R is an alkyl radical having from 8 to 24 carbon atoms;
   (c) from 0.1 to 10 phr of a methylene acceptor; and
   (d) from 0.1 to 10 phr of a methylene donor.

2. The compound of claim 1 wherein said rubber is natural rubber.

3. The compound of claim 1 wherein said rubber is a blend of natural rubber and a synthetic rubber selected from the group consisting of cis-1,4-polyisoprene, polybutadiene, copolymers of isoprene and butadiene, copolymers of acrylonitrile and butadiene, copolymers of styrene, butadiene and isoprene, copolymers of styrene and butadiene and blends thereof.

4. The compound of claim 1 wherein said rubber comprises a blend of natural rubber and a synthetic rubber and said natural rubber is present in an amount ranging from 5 to 95 weight percent of the total rubber present in the compound.

5. The compound of claim 1 wherein R is an alkyl radical having from 8 to 24 carbon atoms.

6. The compound of claim 1 wherein said ester of aminobenzoic acid is present in an amount ranging from 0.5 to 2 phr.

7. The compound of claim 1 wherein said methylene donor is selected from the group consisting of hexamethylenetetramine, hexaethoxymethylmelamine, hexamethoxymethylmelamine, lauryloxymethylpyridinium chloride, ethoxymethylpyridinium chloride, trioxan hexamethoxymethylmelamine polymers of formaldehyde, hexakis-(methoxymethyl)melamine, N,N',N"-trimethyl/N,N',N"-trimethylolmelamine, hexamethylolmelamine, N-methylolmelamine, N,N'-dimethylolmelamine, N,N',N"-tris(methoxymethyl)melamine and N,N'N"-tributyl-N,N',N"-trimethylol-melamine.

8. The compound of claim 1 wherein said methylene acceptor is selected from the group consisting of activated phenols by ring substitution and cashew nut oil modified novalak-type phenolic resin.

9. The compound of claim 8 wherein said activated phenol is selected from the group consisting of resorcinol, cresols, t-butyl phenols, isopropyl phenols, ukyl phenols and mixtures thereof.

10. The rubber compound of claim 1 additionally containing a cobalt compound.

11. The rubber compound of claim 10 wherein said cobalt compound is present in an amount ranging from 0.2 to 5 phr.

12. The rubber compound of claim 10 wherein said cobalt compound is selected from the group consisting of cobalt salts of fatty acids, cobalt salts of aliphatic or alicyclic carboxylic acids having from 6 to 30 carbon atoms, cobalt chloride, cobalt naphthenate, cobalt carboxylate and organocobalt-boron complexes.

13. The rubber compound of claim 12 wherein said cobalt compound is selected from the group consisting of cobalt neodecanoate and cobalt naphthenate.

14. A pneumatic tire having a wire coat comprising the compound of claim 1.

15. A pneumatic tire having a bead coat comprising the compound of claim 1.

* * * * *